United States Patent [19]

Olin

[11] Patent Number: 5,664,923

[45] Date of Patent: Sep. 9, 1997

[54] BALE ACCUMULATOR

[76] Inventor: Ray L. Olin, Box 35, New Salem, N. Dak. 58563

[21] Appl. No.: 225,887

[22] Filed: Apr. 11, 1994

[51] Int. Cl.$^6$ ............................................. A01D 90/00
[52] U.S. Cl. .................. 414/24.5; 414/111; 414/789.7
[58] Field of Search ........................... 414/24.5, 24.6, 414/111, 789.7, 519; 298/23 A, 23 M

[56] References Cited

U.S. PATENT DOCUMENTS

| | | | |
|---|---|---|---|
| 2,316,435 | 4/1943 | James | 414/111 |
| 3,157,295 | 11/1964 | Pridgeon et al. | 214/6 |
| 3,163,302 | 12/1964 | Pridgeon | 414/111 |
| 4,050,598 | 9/1977 | Schurz | 214/518 |
| 4,103,794 | 8/1978 | Shaw | 214/518 |
| 4,190,391 | 2/1980 | Sesser et al. | 414/39 |
| 4,268,199 | 5/1981 | Fontrier | 414/111 |
| 4,376,607 | 3/1983 | Gibson | 414/24.6 |
| 4,431,357 | 2/1984 | Butler | 414/24.5 |
| 4,573,845 | 3/1986 | Carpenter | 414/24.5 |
| 4,619,570 | 10/1986 | Siebenga | 414/39 |
| 4,844,675 | 7/1989 | Strosser et al. | 414/111 |
| 4,938,646 | 7/1990 | Elias et al. | 414/24.5 |

FOREIGN PATENT DOCUMENTS

| | | | |
|---|---|---|---|
| 0424192 | 4/1991 | France | 414/24.5 |
| 2202818 | 10/1988 | United Kingdom | 414/519 |

*Primary Examiner*—Karen B. Merritt
*Assistant Examiner*—Douglas Hess
*Attorney, Agent, or Firm*—Moore & Hansen

[57] ABSTRACT

The present invention provides a bale accumulator for accumulating at least one cylindrically configured bale of crop stock thereon following its discharge by a baler. The bale accumulator has a conveyor module for receiving a bale from the baler and conveying it to a storage module where it is held pending selective discharge by the operator.

12 Claims, 6 Drawing Sheets

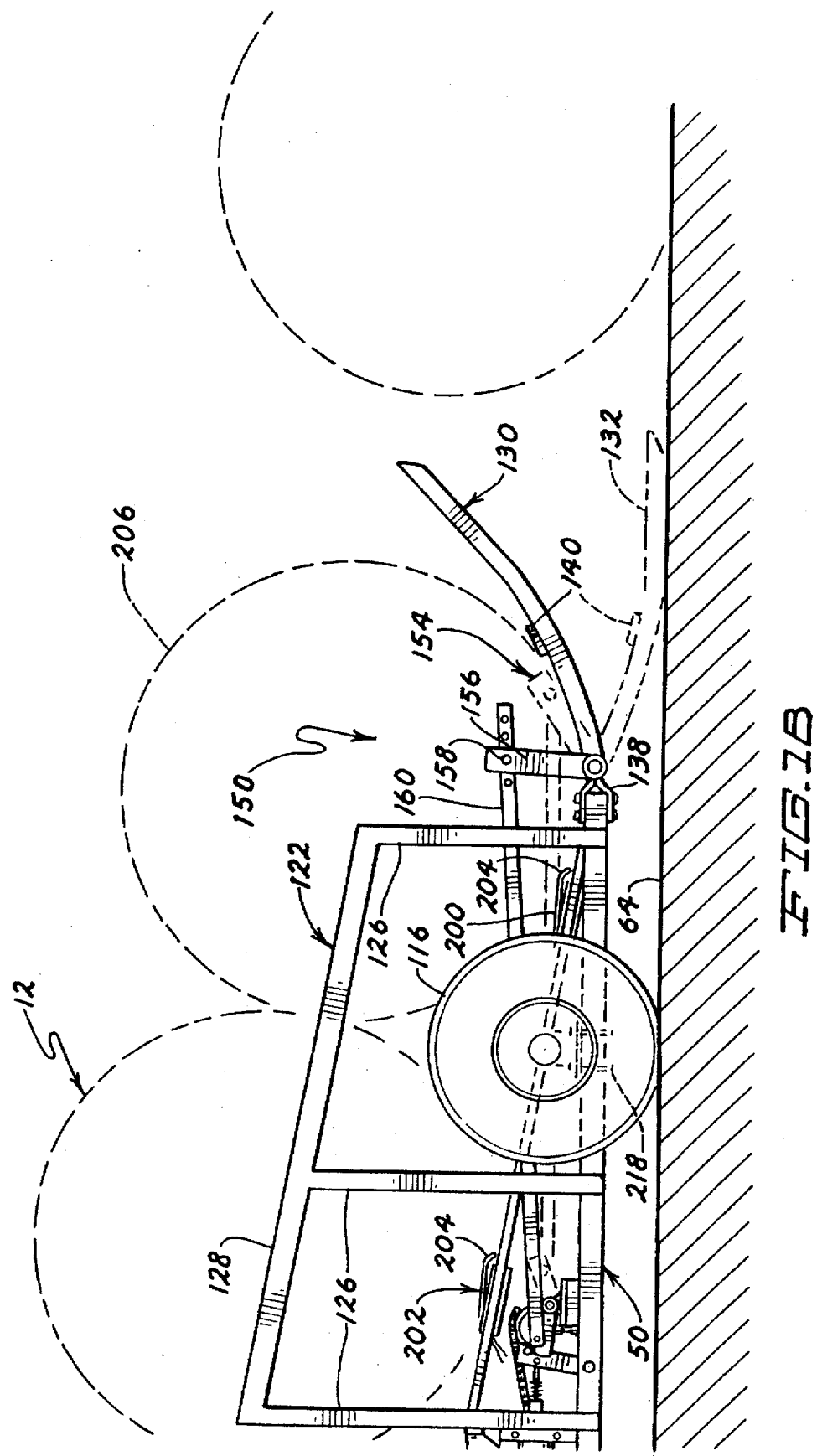

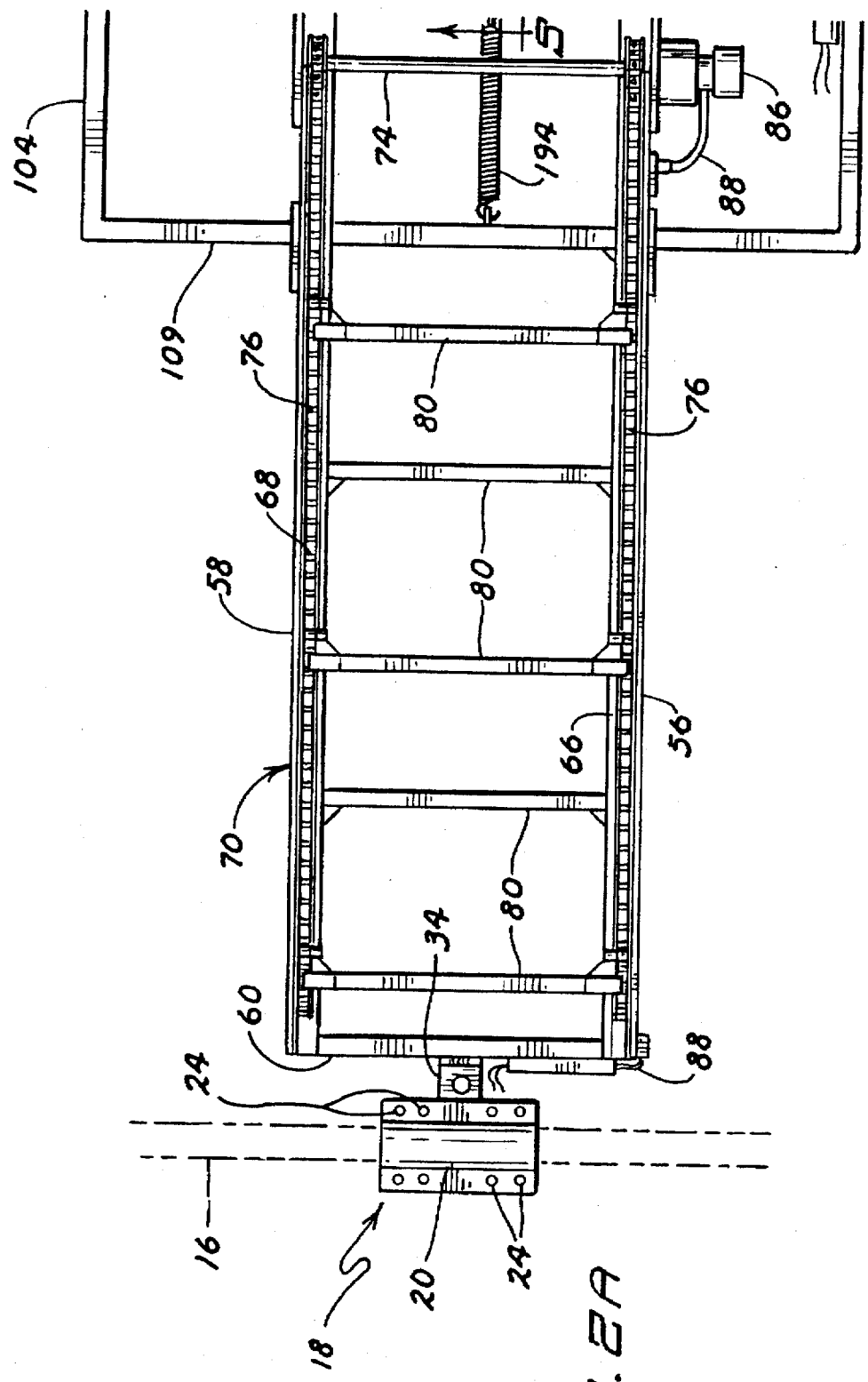

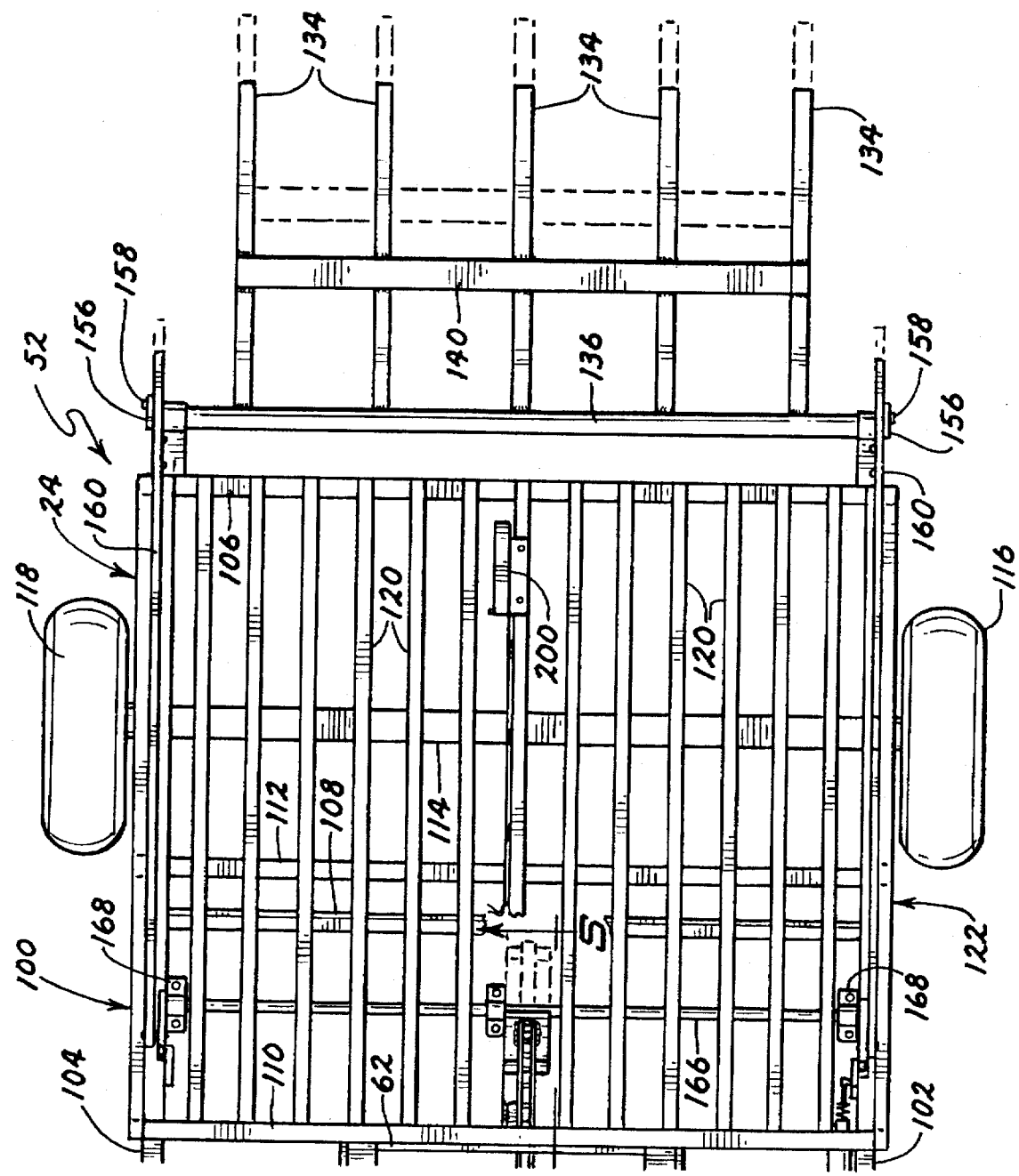

BALE ACCUMULATOR

FIELD OF THE INVENTION

The present invention relates generally to apparatus for accumulating cylindrically configured bales of crop stock as the bales are discharged from the baler and particularly to such apparatus useful for accumulating large cylindrically configured bales on a sloped platform by means of an endless conveyor for easy discharge therefrom.

BACKGROUND OF THE PRESENT INVENTION

Bale accumulators of various types are well known within the baling art. Such accumulators are used in conjunction with square bales of crop stock, loose stacks of crop stock, and cylindrical bales of crop stock of varying diameters. Bale accumulators are generally designed and constructed to receive a plurality of bales of crop stock, typically hay or straw bales, from a baler and to temporarily store the received bales, all without the performance of manual labor by an individual, until they can be delivered to a permanent storage location. While long known in the art, bale accumulators have taken on an increasing level of importance in the farming community as the number of available persons for performing physical labor has decreased in that same community. At least partially as a result of this decrease in available labor, farmers have tended to want to increase the size of the bales of crop stock so as to reduce the overall number of bales that must be handled and have tended to rely on mechanical means for manipulating the bales as desired.

Examples of bale accumulators are found, for example, in U.S. Pat. No. 3,157,295 to Pridgeon, et al.; U.S. Pat. No. 4,050,598 to Schurz; U.S. Pat. No. 4,103,794 to Shaw; U.S. Pat. No. 4,190,391 to Sesser, et al.; U.S. Pat. No. 4,268,199 to Fontrier; U.S. Pat. No. 4,376,607 to Gibson; U.S. Pat. No. 4,573,845 to Carpenter; U.S. Pat. No. 4,619,570 to Siebenga; and U.S. Pat. No. 4,938,646 to Elias, et al. The accumulators disclosed in the foregoing patents often rely on complex mechanical apparatus to function and are not readily able to handle the large cylindrical bales currently finding widespread favor in the farming community. These bales may fall within a weight range of about 500 pounds to about 2500 pounds and have diameters between 3 feet and 6 feet.

In a typical baling operation, a large cylindrical bale is baled by a baler pulled by a motive source of power, such as a farm tractor, that is operated by the farmer. The baler usually takes the form of including a front portion and a rear discharge gate pivotally mounted thereto that together with the front portion forms therewithin a bale forming chamber. When a bale is formed, the rear discharge gate will be pivoted open and the bale will be discharged onto the ground. The end result is a large number of these large bales being scattered across a field that need to be gathered and stored in a single location.

As part of the typical bale discharge operation, the farmer must usually stop the baler, back up a short distance, and then open the discharge gate of the baler. The backing up step is necessary since the baler must be pulled forward during the bale discharge. If the baler were not first backed up, unbaled crop stock would be left lying in the field as the baler was pulled ahead for the discharge of the formed bale. To avoid this problem, farmers and baler manufacturers have long sought a bale "kicker" or some similar device that would push the bale away from the baler so as to obviate the need for the backing up step. One such bale "kicker" or "pusher is shown in U.S. Pat. No. 5,159,876 to Olin. While these kickers or pushers are somewhat successful, they still leave the bales of crop stock scattered across the field.

It would be desirable to have a bale accumulator for bales of the size falling within the aforementioned range that provided the farmer with the option of conveying a plurality of bales to a single desired storage location or of depositing a plurality of bales at a plurality of locations in the field so as to ease the later accumulation and storage of the bales at the desired storage location.

SUMMARY OF THE INVENTION

It is an object of the present invention to provide new and improved apparatus that is not subject to the foregoing disadvantages of the prior art bale accumulators.

It is another object of the present invention to provide an improved bale accumulator for large cylindrically configured bales of crop stock.

It is still another object of the present invention to provide an improved bale accumulator that is readily disassembled into a plurality of modules for easy transport thereof.

It is yet another object of the present invention to provide an improved bale accumulator that includes an endless chain conveyor that conveys bales of crop stock to a temporary storage platform.

It is still yet another object of the present invention to provide an improved bale accumulator for large cylindrical bales of crop stock that allows the bale accumulator operator to selectively discharge the bales at a desired location.

The foregoing objects of the present invention are provided by a bale accumulator capable of being towed behind a baler useful for producing cylindrically configured bales of crop stock, the baler itself being pulled by a motive power source such as a farm tractor and being provided for receiving a plurality of bales from the baler as each bale is discharged therefrom and for storing at least one bale thereon during baling operations. A bale accumulator according to the present invention has first and second accumulator portions and means for removably attaching the accumulator to the baler. The first accumulator portion includes means for receiving a bale of crop stock from the baler and transporting the bale to the second portion and the second accumulator portion includes means for receiving at least one bale of crop stock from the first accumulator portion and means for retaining the at least one bale of crop stock on the second accumulator portion until the bale is discharged from the accumulator.

In an embodiment of the present invention the means for receiving and transporting may be a dual chain flighted conveyor driven by a hydraulic motor and defining a linear direction of travel in an upward direction from the baler. The means for receiving at least one bale of crop stock from the first accumulator portion may be a substantially planar receiving platform disposed in an angular relation to the conveyor so as to form a downwardly extending ramp upon which a bale rolls as it is discharged from the conveyor. Thus, the bale accumulator receiving platform includes front and rear ends with the front end being disposed at a greater elevation relative to the travelling surface than the rear end so as to provide a ramp down which the bales may roll during discharge from the bale accumulator.

The second accumulator portion may further include means for selectively allowing the discharge of accumulated bales from the accumulator. According to the present invention, such means may be an accumulator discharge gate that is movable from a closed position for retention of any bales on the receiving platform to an open position for discharge of stored bales from the receiving platform. The bale accumulator further has an actuator for releasing a latch so as to selectively allow the accumulator discharge gate to move under the weight of a stored bale between the open and closed positions and a retractor for moving the accumulator discharge gate between the closed and open positions. If desired the second accumulator portion may include one or more sensors for providing an indication to the baler operator that the receiving platform has received a bale.

The present invention further contemplates a method for accumulating on a bale accumulator a plurality of sequentially formed, substantially cylindrically configured bales of crop stock produced by a baler including the steps of moving the baler rear gate portion from its closed to its open position; discharging a formed bale from the bale-forming chamber of the baler; receiving on the first accumulator portion the bale discharged from the baler and transporting the discharged bale to the second accumulator portion; and closing the baler rear gate portion after the discharged bale has been received by the accumulator second portion.

In one embodiment a bale accumulator in accord with the present invention will have a modular structure such that the accumulator may be readily and quickly broken down into individual modules for ease of transport. A modular bale accumulator according to the present invention may include a conveyor module, a bile storage module and a wheel module. The bale storage module may further include an end gate module. By disassembling the bale accumulator according to the foregoing modular structure, the bale accumulator may be compactly placed into a transport position for the purpose of transporting the accumulator from the manufacturer or wholesaler to the retail seller.

The foregoing objects of the invention will become apparent to those skilled in the art when the following detailed description of the invention is read in conjunction with the accompanying drawings and claims. Throughout the drawings, like numerals refer to similar or identical parts.

BRIEF DESCRIPTION OF THE DRAWINGS

FIGS. 1A and 1B together show in a side elevation view a bale accumulator in accord with the present invention;

FIGS. 2A and 2B together show in a top elevation view a bale accumulator in accord with the present invention;

DETAILED DESCRIPTION OF THE INVENTION

Figure 1A:
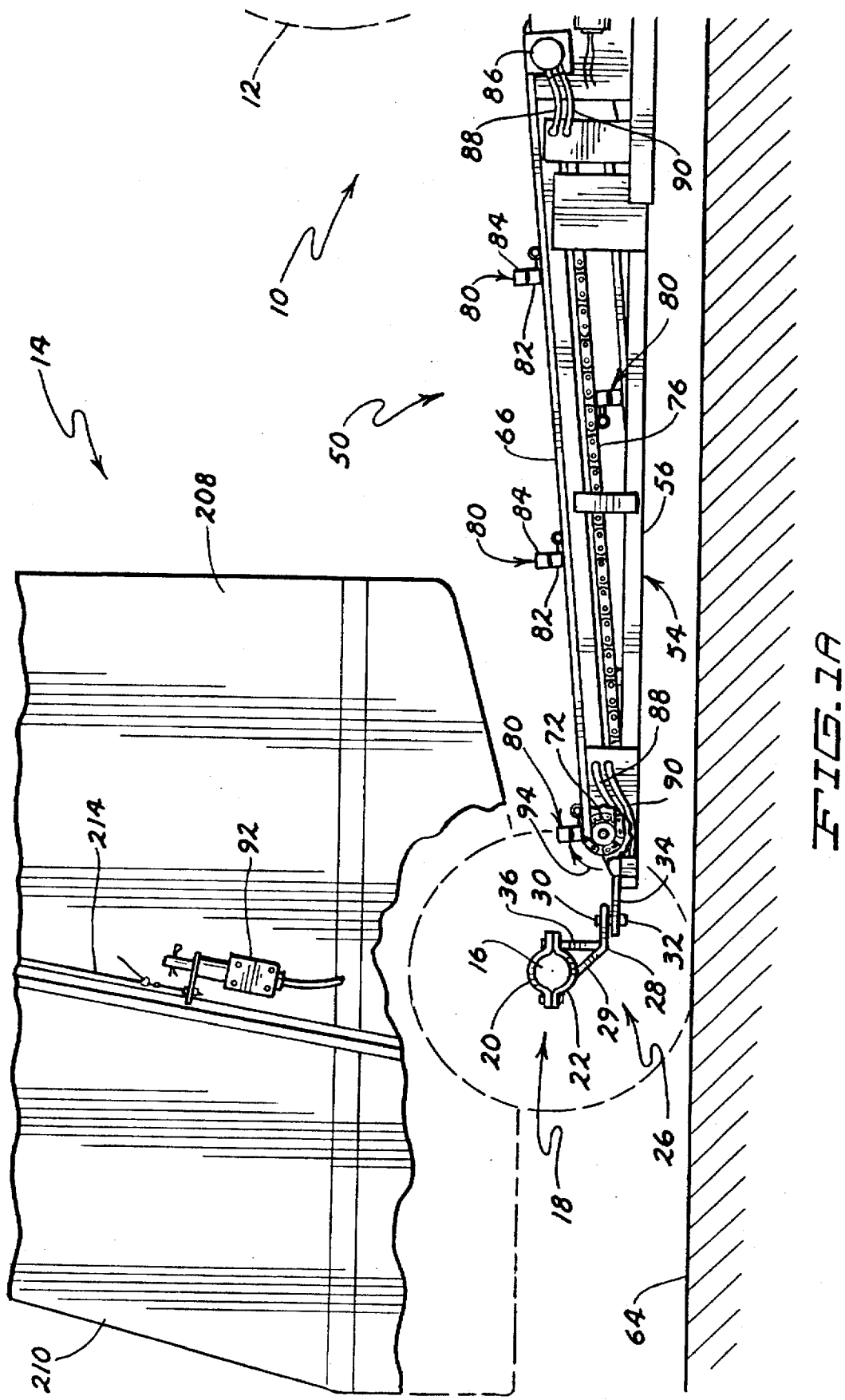

FIGS. 1A and 1B show a bale accumulator 10 in accord with the present invention for receiving large cylindrical bales 12 from a baler 14 and storing them until they can be transported to a desired storage location. Bale accumulator 10 is attached to the axle 16 of the baler 14 by means of a hitch adapter 18. Few if any balers are manufactured including a hitch by which some other farm implement, such as the new and non-obvious bale accumulator 10, can be towed therebehind. Consequently, some apparatus must be provided by which the bale accumulator 10 can be readily and easily hitched to baler 14 for operational use. Hitch adapter 18 includes a pair of axle plates 20, 22 configured to jointly embrace therebetween the rear wheel axle 16. Plates 20 and 22 are fastened tightly together by known fastening means such as nut/bolt fasteners 24 (FIG. 2A). As fasteners 24 are tightened, plates 20 and 22 firmly clamp axle 16 therebetween. Hitch adapter 18 further includes an angularly configured draw bar 26 that extends downwardly and rearwardly from the bottom hitch plate 22. Draw bar 26 has a substantially horizontally extending portion 28 having a hole (not shown) that receives a bolt 30 therein and also has a diagonally extending portion 29 that extends from the plate 22 downwardly and rearwardly. Bolt 30 has a threaded end that receives a nut 32. Bolt 30 extends downwardly through a hole in a forwardly extending tongue 34 attached to bale accumulator 10. Hitch adapter 18 may also have a support bar 36 that is attached to hitch plate 22 in a known manner such as welding and that extends downwardly into a fixed connection with the horizontally extending portion 28 of draw bar 26. Support bar 36 is provided so as to strengthen draw bar 26 and prevent it from bending under the weight of the bales carried by the bale accumulator 10, particularly as they drop out of the baler 14 onto the bale accumulator 10.

Referring now FIGS. 1A, 1B, 2A and 2B, bale accumulator 10 includes a conveyor portion 50 and a bale storage portion 52. Conveyor portion 50 includes a supporting frame 54. Frame 54 includes spaced apart, parallel, elongate, front to rear extending members 56 and 58. Frame members 56 and 58, which can be formed from right angle steel bars, are held in their spaced apart relationship by at least a front and a rear transverse members 60 (FIG. 1B) and 62 (FIG. 2B), respectively. As best seen in FIG. 1A, when accumulator 10 is hitched to baler 14, members 56 and 58 are substantially parallel with a planar ground surface 64. Frame 50 further includes a pair of spaced apart, right angle elongate steel bar members 66 and 68 supported in an angular relation to members 56 and 58. As shown, member 66 is disposed at a five degree angle to member 56. This angle may vary; however, the angle must be sufficiently shallow such that the bale can clear the open baler end gate 208 as it is moved up the conveyor portion 50 so as to prevent the bale from becoming stuck between the conveyor portion 50 and the baler end gate.

Conveyor portion 50 further includes an endless chain conveyor 70 supported by frame 54. Thus, conveyor portion 50 includes a pair of forwardly disposed idler gears 72, one of which is seen in FIG. 1A and a pair of rearwardly disposed gears (not shown). The rearwardly disposed gears are mounted for rotation by frame 54 on a common axle 74. The gears mount a pair of spaced apart chains 76 and 78 that in turn mount transverse members or flights 80. As shown in the Figures, flights 80 each include a pair of square tubes 82, 84 fixedly attached to each other. If desired, flights 80 may take other configurations, but they should be at least about two inches in height. Flights 80 are used to move a bale rearwardly and upwardly after it is discharged by baler 14.

Conveyor 70 is activated by a hydraulic motor 86 that receives hydraulic fluid from the motive power for baler 14, typically a farm tractor. The hydraulic fluid flows to the hydraulic motor 86 through hoses 88, 90 (FIG. 1A), which in turn are connected to a valve 92. Valve 92 is described in U.S. Pat. Nos. 5,159,876 and 5,263,410 to Olin, both of which are incorporated herein by reference and which are owned by the same inventor as in the present application. Thus, conveyor 70 is activated by the flow of hydraulic fluid through hydraulic motor 86, which in turn causes conveyor 74 axle to rotate, rotating conveyor 70 clockwise as indicated by arrow 94. As will be described in additional detail later, a bale discharged from baler 14 will fall or roll onto conveyor 70, will be caught by one of the flights 80, and moved or slid rearwardly and upwardly on conveyor portion 50 onto bale storage portion 52.

Referring now primarily to FIGS. 2A and 2B, bale storage portion 52 will be described. Bale storage portion 52 includes a frame 100 comprising a pair of elongate, parallel, spaced apart, horizontally extending frame members 102 and 104. Members 102 and 104 are held in their spaced apart relationship by at least one transverse frame member 106, though at least second and third such members 108 and 109 are shown in the figures. Frame 100 further includes a plurality of transversely extending ramp support bars 110 and 112, each support bar being elevated a different height above frame members 102 and 104. Ramp support bars 110 and 112, together with rearwardly disposed transverse frame member 106 and the axle 114 for bale accumulator wheels 116 and 118, support a plurality of elongate ramp bars 120 at an angle relative to frame members 102 and 104. Ramp bars 120 form a platform or ramp upon which the bales of crop stock rest temporarily during baling or transport operations. As seen in FIG. 1B, the ramp bars are disposed at an angle of about ten degrees relative to frame members 102, though they may be disposed at any angle subject to the bale being able to roll off the bale storage portion 52 under the influence of gravity. Thus, this angle could be increased by lengthening the conveyor portion 50 such that the bales reach a greater height above the ground so that the bales have a greater distance to drop. The grade of the slope on the ramp bars 120 could therefore be increased. The ramp bars 120 are disposed at such an angle and are of such a length that their rearwardmost ends, which lie atop transverse frame member 106, are at an elevation below the axle 114 of the accumulator wheels 116 and 118. The forwardmost ends of the ramp bars 120 are elevated relative to the rearward ends thereof such that those forward ends of the ramp bars 120 lie slightly below the rearwardmost portion of conveyor 70. By disposing them in this manner, bales can easily roll off the conveyor 70 onto the ramp bars 120 and then downwardly and rearwardly on bale storage portion 52.

It will also be seen that bale storage portion 52 includes a pair of upright side walls 122 and 124. As best seen in FIG. 1B, each side wall 122 and 124 includes a plurality of upright bars 126 attached at one end to frame 100. An angularly extending bar 128 extends across the other ends of the upright bars 126. Side walls 122 and 124 help center a bale as it rolls downwardly on the inclined ramp provided by the bale storage portion 52.

The bale storage portion 52 may also include a discharge end gate 130, shown in phantom in FIGS. 1B and 2B in the open, bale discharging position 132. As seen in FIG. 1B, a bale loaded on bale accumulator 10 will bear against end gate 130, a feature involved in easily and selectively unloading bales from the accumulator 10. End gate 130 comprises a plurality, here five, of arcuate shaped bars 134. Arcuate bars 134 are attached at an end thereof by known means such as welding to a tube 136. Tube 136 is rotationally received at opposing ends by a clevis 138 that is bolted to the rearward ends of horizontally extending frame members 102 and 104. End gate 130 rotates between the bale retaining position shown in solid lines and the open position 132 shown in phantom lines to form another ramp upon which the bales may roll. Thus, when the end gate is in the open position, bales can roll off bale storage portion 52 onto the open end gate 132 and from there onto the ground, as shown in FIG. 1B. To provide support for arcuate bars 134 a cross piece 140 can be welded to arcuate bars 134 if desired.

Bale accumulator 10 further includes means for selectively moving the end gate 130 between the open and closed positions so that the accumulator operator can selectively discharge bales of crop stock therefrom as desired. Thus, accumulator 10 includes an end gate release mechanism 150 shown in the latched position 152 in solid lines and in the unlatched position 154 in phantom lines in FIG. 1B. Release mechanism 150 will be described with principle reference to FIGS. 1B, 3 and 4. Mechanism 150 includes a pair of end gate arms 156 rigidly attached at an end thereof to tube 136. The other end of each end gate arm 156 includes a through hole to receive a fastener 158 by which the end gate arm 156 is pivotally attached to an end of an elongate bar 160 that extends forwardly and rearwardly. If desired, the end of bar 160 to which end gate arm 156 is attached may include a plurality of through holes as shown to allow an adjustable attachment between arms 156 and bars 160. The other end of bar 160 is pivotally attached by means of a fastener 162 to a latch bar 164. Latch bar 164 is rigidly attached to a transversely extending rotatable bar shaft. Shaft 166 is rotatably received at each end thereof by an appropriate bearing collar 168 (best seen in FIG. 2B) attached to horizontally extending frame members 102 and 104. The attachment of shaft 166 to the latch bars 164 on each side of the bale accumulator prevents one lateral side of end gate 130 from pivoting relative to the other lateral side and thus enables end gate 130 to pivot open from the closed position without canting.

Figure 3:
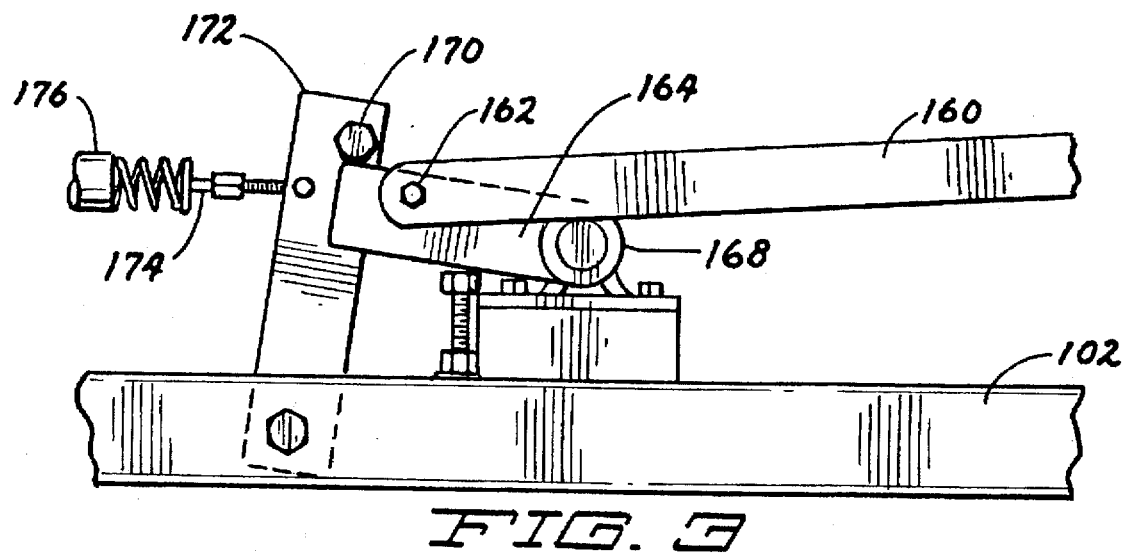
FIG. 3 shows the release arm for the bale accumulator end gate in the latched position.
Figure 4:
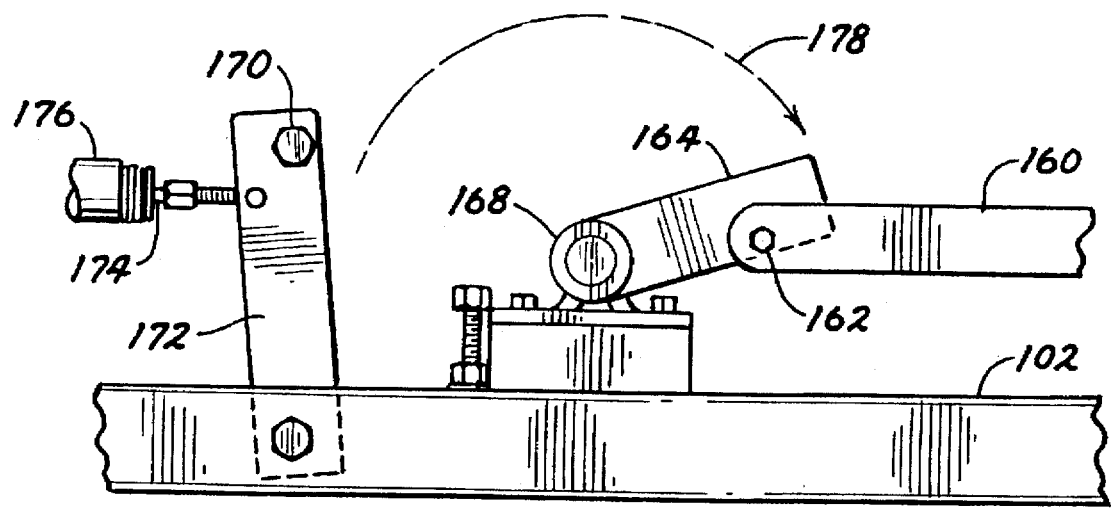
FIG. 4 depicts the release arm for the bale accumulator end gate in the unlatched position.

Referring now to FIGS. 3 and 4 principally, it will be noted that FIG. 3 shows latch bar 164 latched beneath a pin 170 that extends outwardly from an arm 172. Arm 172 is disposed on the left side of the bale accumulator 10 as viewed from the rear (as best seen in FIG. 2B). No similar arm is needed on the right side of the bale accumulator. Arm 172 is in turn attached to the plunger 174 of a solenoid 176. Solenoid 176 will be connected in a known manner to the appropriate switch mechanism or other form of power disposed within the source of motive power for baler 14 and bale accumulator 10, the switch being selectively activated by the operator. As shown in FIG. 3, the solenoid plunger 174 is extended and the end gate is in the closed position. FIG. 4 shows the solenoid plunger 174 in the retracted position, thus pivoting arm 172 forwardly about its pivotal attachment to frame member 102. As arm 172 is pivoted forwardly, latch bar 164 is free to pivot rearwardly, which it will do as indicated by arced arrow 178 as the weight of a bale loaded on bale accumulator 10 forces the end gate 130 into the open position 132 shown in FIG. 1B. Thus, activation of a switch by the operator will cause the solenoid 176 to retract the plunger 174 in a known manner, pivoting arm 172 forwardly and unlatching latch arm 164. The weight of a loaded bale of crop stock bearing against end gate 130 as shown in FIG. 1B will force end gate 130 to pivot to the open position, which it is now free to do because of the release of latch arm 164. As the end gate 130 pivots open, end gate arms 156 will pivot rearwardly, thereby pulling bars 160 rearwardly and pivoting latch bars 164 rearwardly. As latch bars 164 pivot, rotatable shaft 166 will rotate in a clockwise direction as viewed from the side elevation view shown in FIGS. 1A and 1B. In this manner, then, the end gate 130 may be opened for the selective discharge of bales therefrom.

Figure 5:
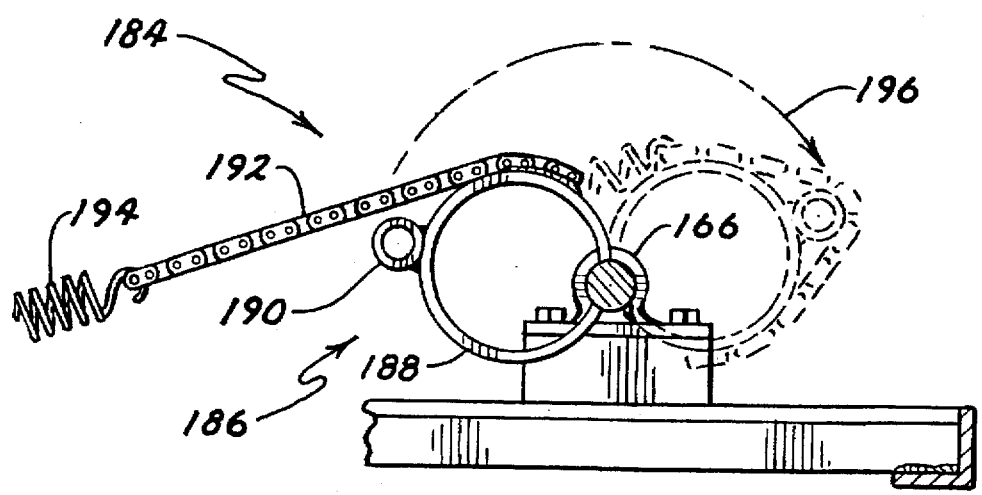
FIG. 5 illustrates the retractor used to return the bale accumulator end gate from the unlatched to the latched position.

Bale accumulator 10 may also include an end gate retractor 184 to move the end gate 130 from the open to the closed position. Referring now principally to FIG. 5 and as needed to FIGS. 1B and 2B, end gate retractor 184 will now be described. Retractor 184 includes an eccentric 186 that is rigidly attached to shaft 166 so as to rotate in a clockwise direction therewith as shaft 166 rotates when end gate 130 is pivoted open by the weight of a bale bearing thereagainst as previously described. Eccentric 186 includes a first cylinder 188 attached to shaft 166 and a second cylinder 190 attached to cylinder 188 substantially directly opposite of shaft 166. Retractor 184 also includes a chain 192 rigidly attached at one end thereof to eccentric 186 and at the other end to one end of an expansion spring 194. The other end of spring 194 is attached to forward transverse frame member 109 (FIG. 2A) of frame 100 of bale storage portion 50. Thus, as the end gate 130 is pivoted open under the weight of a bale, shaft 166 will be rotated as previously described, causing eccentric 186 to rotate therewith as shown by the dotted line arrow 196 and thereby wrapping chain 192 thereabout. This action in turn causes spring 194 to be stretched, creating a biasing force on the eccentric 186. As the bale rolls off the end gate 130, the biasing force imposed by spring 194 will rotate eccentric 186 counterclockwise as viewed in FIG. 5 and thus shaft 166 also will be rotated in a counterclockwise direction as viewed in FIG. 5. This in turn will cause arm 172 to be pivoted forwardly such that the end thereof latches under latch pin 170. In this manner, end gate 130 will once again be latched in the closed position and capable of retaining bales of crop stock on bale accumulator 10.

Referring now to FIG. 2B, it will be observed that the present invention includes a pair of sensors, first bale sensor 200 and second bale sensor 202, disposed on the bale storage portion 52. The first and second bale sensors 200 and 202 are provided to give the baler and bale accumulator operator an indication of when a bale has been properly received by the bale accumulator 10. As is well known, balers such as baler 14 are of such a size and dimension that the operator is unable to see directly therebehind and, other than seeing the baler discharge gate open, cannot see the bale of crop stock actually discharged from the baler when the baler is in a direct line with the tractor. Thus, in order to provide an indication of when a bale has been conveyed by conveyor portion 50 to bale storage portion 52, sensors 200 and 202 are provided. Sensors 200 and 202 may take many different forms and as shown each comprise a sensor lever arm 204 that pivots under the weight of a bale so as to close a switch to complete an electrical circuit. The completed electrical circuit will be routed to the tractor where the operator sits. A light source, such as a bulb or and LED, will be illuminated when the switch is closed, thereby alerting the operator that a bale is loaded on the bale storage portion 52. Thus, as a bale is discharged, it will roll over second bale sensor 202, momentarily causing the light for sensor 202 to become illuminated, and then on to first bale sensor 200, which will cause the light for that sensor to become illuminated. When a second bale is loaded onto the bale storage portion 52, the light for the second bale sensor 202 will become illuminated also, thereby indicating to the operator that the bale accumulator has two bales loaded onto the bale storage portion 52. During discharge of the bales from the bale accumulator, a spring (not shown) that biases the sensor lever arms 204 into the open circuit position will force the sensor lever arms 204 to that position as the weight of the bale rolls off of the sensor lever arms 204. Thus, as shown in FIG. 1B, first bale sensor 200 will indicate the presence of a bale 206 and second bale sensor 202 will indicate the presence of bale 12 on the bale accumulator 10.

Figure 7:
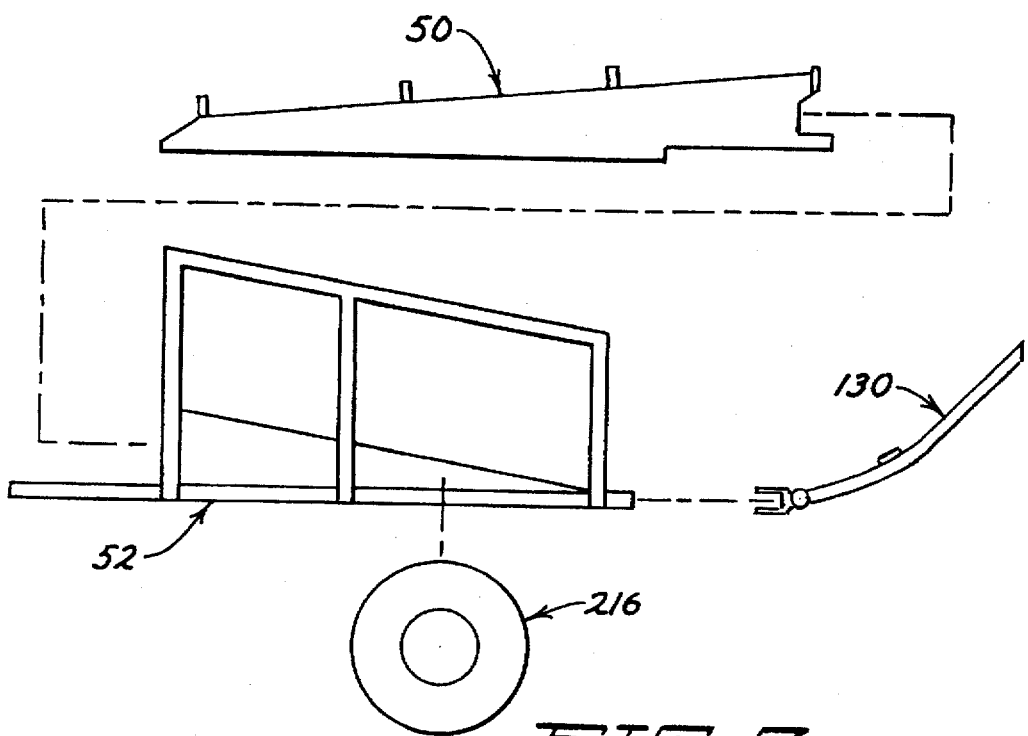
FIG. 7 illustrates the modules forming the present invention.

Referring now to FIG. 7, it will be seen that the present invention comprises four separate, easily separable modules. Thus, the present invention can be described as including modules comprising conveyor portion 50, bale storage portion 52, discharge end gate 130 and a wheel and axle module 216. As previously described, discharge end gate 130 is attached to the bale storage portion 52 by means of a clevis 138 which is bolted as shown in FIG. 1B thereto for a rapid and easy removal therefrom. Similarly, the conveyor portion 50 and the bale storage portion 52 can be attached to each other bolts (not shown) for a rapid and easy separation from each other. Finally, wheel and axle module 216 can be attached to the bale storage portion 52 by means of an appropriate fastener, such as the bolts 218 shown in phantom in FIG. 1B. With the present modular arrangement, the present invention can be shipped from the manufacturer to a distributor or retailer in a compact fashion, thereby reducing shipping costs over that which could be expected if the accumulator 10 were shipped completely assembled.

The present invention thus provides a bale accumulator capable of being towed behind a cylindrical baler comprising first and second accumulator portions, the first accumulator portion including means for receiving a bale of crop stock from the baler and transporting the bale to the second portion and the second accumulator portion including means for receiving a bale of crop stock from the first accumulator portion and means for retaining the bale on the second accumulator portion until the bale is discharged from the accumulator. Each of the accumulator portions defines a substantially linear path of bale travel that are angularly disposed relative to each other. The paths are disposed relative to each other such that the linear paths of bale travel define an inverted "V" configuration. In the preferred embodiment described herein the means for receiving and transporting of the first accumulator portion includes a conveyor driven by a hydraulic motor. The means for receiving a bale of crop stock from the first accumulator portion includes a receiving platform that is substantially planar and is disposed at an angle relative to the travelling surface of the baler and accumulator.

The second accumulator portion further includes means for selectively allowing the discharge of accumulated bales from the accumulator, the means including an accumulator discharge gate that is movable from a closed position for retention of any bales on the receiving platform to an open position for discharge of any bales from the receiving platform. The selective discharge means includes an actuator that is selectively operable and is provided for selectively moving the accumulator discharge gate between the open and closed positions. In the embodiment shown herein, the actuator comprises a first elongate lever arm, one end of the first lever arm being pivotally attached to the accumulator discharge gate; a second lever arm, the second lever arm being pivotally attached at an end thereof to the first lever arm, the second lever arm being movable between latched and unlatched positions wherein the accumulator discharge gate is in the closed and open positions respectively; means for latching the second lever arm in the latched position; and means for selectively releasing the means for latching such that the second lever arm may be moved from the latched to the unlatched position.

As shown, the means for selectively releasing the means for latching may be a solenoid activated by the operator.

The bale accumulator may also include means for retracting the accumulator discharge gate from the open position to the closed position. Such a means may comprise a coil expansion spring having an end attached to the accumulator and an end attached to an eccentric that rotates as the end gate is pivoted open under the weight of a bale. A bale accumulator in accord with the present invention may also include means for sensing when a bale has been received by the second accumulator portion.

OPERATION OF THE PRESENT INVENTION

Figure 6:
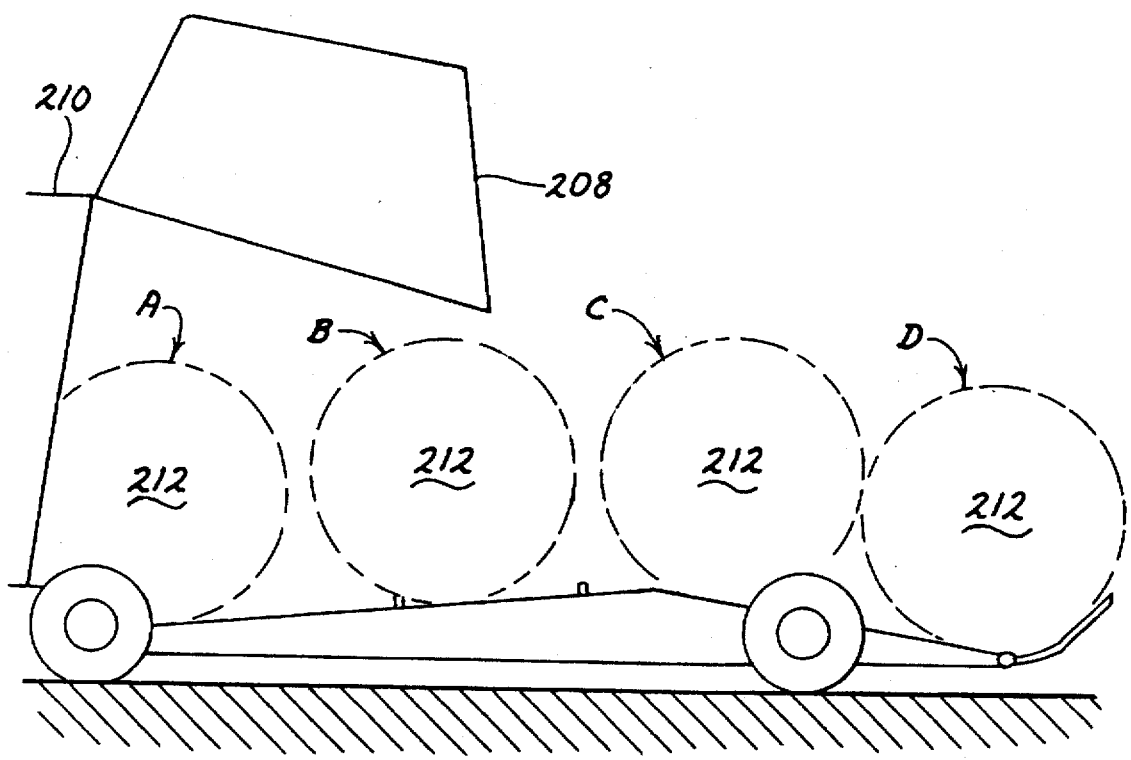
FIG. 6 shows in a schematic format the motion of a bale as the bale is discharged from the baler and moved rearwardly on the accumulator.

Referring now to FIG. 6 and FIG. 1A in particular, a bale discharging sequence will be described. As shown in FIG. 6, baler 14 includes a rear gate 208 that is pivotally attached to a baler front portion 210 and together therewith forms a bale forming chamber. When a bale of crop stock is formed within baler 14, the operator will stop the baler and actuate known hydraulic circuits so as to cause baler rear gate 208 to pivot open to discharge a formed bale 212 of crop stock. The bale will drop out of the baler 12 onto the bale accumulator 10 at the front end thereof, substantially occupying the position indicated by the letter "A". The conveyor 70 will be activated in a manner to be described hereinafter, resulting in the conveyance of bale 212 upwards and rearwards through an intermediate position indicated by the letter "B" providing room to close the baler end gate. As the bale 212 reaches the bale storage portion 52 the bale 212 will roll downwards and rearwards thereon through an intermediate position indicated by the letter "C", momentarily causing sensor 202 to indicate its presence. Bale 212 will continue to roll down the ramp provided by bale storage portion 52 until it reaches the rearwardmost position indicated by the letter "D", where it will activate first bale sensor 200. Bale 212 will bear against accumulator discharge end gate 130 in this position.

When the operator is notified by sensor 200 that bale 212 is in the position "D", baling operations will again commence until a second bale is formed. This bale will also be discharged and will be conveyed in the foregoing manner to the position "C" where it will bear against bale 212. In position "C" the bale will cause sensor 202 to indicate to the operator that a second bale is loaded onto accumulator 10. If desired, the operator can then transport the bales to a predetermined discharge location, or can bale a third bale of crop stock and thus transport three fully formed bales, two held on the accumulator 10 and one held within the bale forming chamber of baler 14, to the discharge location. At the discharge location the operator will actuate the solenoid 176 so as to cause the discharge end gate 130 to pivot open, allowing the stored bales to roll off the accumulator.

As the baler discharge gate 208 pivots open, it will extend a chain 214 attached to valve 92 at one end and at the other to the baler discharge gate 208. As chain 214 is straightened it will cause valve 92 to divert flow of hydraulic fluid from the baler discharge gate hydraulic cylinders (not shown) through hoses 88 and 90 to hydraulic motor 86, thereby actuating the conveyor 70. Thus, the moment of actuation of hydraulic motor 86 is determined by the length of chain 214. Preferably, chain or linkage 214 should be sized to have a length such that conveyor 70 begins operation when the baler rear gate 208 reaches the position of maximum opening and, generally after a bale such as bale 212 falls from the bale forming chamber within baler 14 onto conveyor portion 50. When the operator receives an indication from sensor 200 that the bale has reached position "D", the baler discharge gate 208 can be closed. As the discharge gate 208 closes, the chain 214 will slacken, causing valve 92 to close and ceasing the flow of hydraulic fluid to hydraulic motor 86 and thereby stopping conveyor 70 from operating.

The present invention thus provides a method for accumulating onto a bale accumulator a plurality of sequentially formed, substantially cylindrically configured bales of crop stock produced by a baler with the method comprising the steps of moving the baler rear gate portion from its closed to its open position; discharging a formed bale from the bale-forming chamber of the baler; receiving on the first accumulator portion the bale discharged from the baler and transporting the discharged bale to the second accumulator portion; and closing the baler rear gate portion after the discharged bale has been received by the accumulator second portion.

The present invention having thus been described, other modifications, alterations, or substitutions may now suggest themselves to those skilled in the art, all of which are within the spirit and scope of the present invention. For example, the conveyor could be extended rearwardly into the bale storage portion 52 some or the entire length thereof, thus facilitating using the conveyor to discharge the bales on a flatter bale storage portion, if desired. It is therefore intended that the present invention be limited only by the scope of the attached claims below.

What is claimed is:

1. A bale accumulator, said bale accumulator being capable of being towed behind a baler useful for producing round bales of crop stock, the baler being pulled by a motive power source, said bale accumulator comprising:

first and second accumulator portions, wherein said first accumulator portion includes:
conveyor means for directly receiving a round bale of crop stock from the baler and transporting the bale to the second accumulator portion;
wherein said second accumulator portion includes:
means for receiving at least one bale of crop stock from said first accumulator portion; and
means for retaining the one bale of crop stock on said second accumulator portion until the bale is discharged from said accumulator;
an accumulator discharge gate for selectively allowing the discharge of accumulated bales from said accumulator and actuator means for selectively moving said accumulator discharge gate between an open position and a closed position, and wherein said means for receiving at least one bale of crop stock from said first accumulator portion includes a receiving platform, said accumulator discharge gate includes top and bottom ends and said bottom end of said accumulator discharge gate is pivotally attached to said receiving platform, said actuator means comprising:
a first elongate lever arm, one end of said first lever arm being pivotally attached to said accumulator discharge gate;
a second lever arm, said second lever arm being pivotally attached at an end thereof to said first lever arm at said other end of said first lever arm, said second lever arm being movable between latched and unlatched positions wherein said accumulator discharge gate is in said closed and open positions respectively;
means for latching said second lever arm in said latched position; and
means for selectively releasing said means for latching such that said second lever arm may be moved from said latched to said unlatched position; and
means for removably attaching said accumulator to the baler.

2. The bale accumulator of claim 1 wherein said means for selectively releasing comprises a solenoid, said solenoid being activated by a switch located on the motive power source.

3. The bale accumulator of claim 1 wherein said accumulator discharge gate is moved from said closed position to said open position by the weight of the rearwardmost bale exerting a downwardly directed force thereon.

4. The bale accumulator of claim 1 wherein said actuator means includes means for retracting said accumulator discharge gate from said open position to said closed position.

5. The bale accumulator of claim 4 wherein said retraction means comprises:

a coil expansion spring having first and second spring ends, said first spring end being attached to said accumulator;

means for rotationally engaging said second lever arm such that said means rotates as said second lever arm moves from said latched to said unlatched position; and means for linking said second spring end to said means for rotationally engaging said second lever arm, whereby as said second lever arm moves from said latched to said unlatched position said means for rotationally engaging wraps said means for linking about said means for rotationally engaging such that said coil expansion spring is expanded, thereby exerting a retraction force on said accumulator discharge gate.

6. The bale accumulator of claim 5 wherein said accumulator discharge gate is moved from said closed position to said open position by the weight of the rearwardmost bale exerting a downwardly directed force thereon and wherein after the bale has rolled off the receiving platform said expanded coil spring will exert a restoring force on said accumulator discharge gate so as to return said accumulator discharge gate to its closed position.

7. A bale accumulator, said bale accumulator being capable of being towed behind a baler useful for producing round bales of crop stock, the baler being pulled by a motive power source, said bale accumulator comprising:

first and second accumulator portions, wherein said first accumulator portion includes:

conveyor means for directly receiving a round bale of drop stock from the baler and transporting the bale to the second accumulator portion, said conveyor means being inclined upwardly in a direction toward said second accumulator portion, said conveyor means comprising a pair of endless chains disposed substantially parallel to each other a predetermined distance apart to directly receive and carry the round bales on said chains and a plurality of spaced-apart crossbars extending between said chains to contain the round bales;

wherein said second accumulator portion includes:

means for receiving at least one bale of crop stock from said first accumulator portion; and means for retaining the at least one bale of crop stock on said second accumulator portion until the bale is discharged from said accumulator; and means for removably attaching said accumulator to the baler.

8. A bale accumulator, said bale accumulator being capable of being towed behind a baler useful for producing round bales of crop stock, the baler being pulled by a motive power source, said bale accumulator comprising:

first and second accumulator portions, wherein said first accumulator portion includes:

conveyor means for directly receiving a round bale of crop stock from the baler and transporting the bale to the second accumulator portion, said conveyor means being inclined upwardly in a direction toward said second accumulator portion;

wherein said second accumulator portion includes:

means for receiving at least one bale of crop stock from said first accumulator portion, said receiving means including a receiving platform which is substantially planer and disposed at a shallow angle relative to the traveling surface, said receiving platform including front and rear ends and being disposed at said shallow angle such that the front end is disposed at a greater elevation relative to the traveling surface than is said rear end; and means for retaining one bale of crop stock on said second accumulator portion until the bale is discharged from the accumulator, said means for retaining comprising an accumulator discharge gate having top and bottom ends with the bottom end of said gate being pivotally attached to said receiving platform, said discharge gate being moveable from an upwardly disposed, closed position for retention of round bales on said receiving platform to a downwardly pivoted open position in engagement with the ground for discharge of round bales from said receiving platform, whereby a round bale on the angled receiving platform will roll downwardly by gravity and push the bottom pivoted discharge gate downwardly to said open position, with said gate serving as a ramp to guide round bales onto the ground.

9. A bale accumulator, said bale accumulator being capable of being towed behind a baler useful for producing round bales of crop stock, the baler being pulled by a motive power source, said bale accumulator comprising:

first and second accumulator portions, wherein said first accumulator portion includes:

conveyor means for directly receiving a round bale of crop stock from the baler and transporting the bale to the second accumulator portion, said conveyor means having a bale receiving and conveying surface inclined upwardly from the horizontal in a direction toward said second accumulator portion at a fixed angle of less than about twenty degrees;

wherein said second accumulator portion includes:

means for receiving at least one round bale of crop stock from said first accumulator portion; and means for retaining the at least one round bale of crop stock on said second accumulator portion until the bale is discharged from said accumulator; and means for removably attaching said accumulator to the baler.

10. The bale accumulator of claim 9 wherein:

said conveyor means of said first accumulator portion comprises a pair of endless chains disposed substantially parallel to each other a predetermined distance apart to directly receive and carry the round bales on said chains, and a plurality of spaced-apart cross bars extending between said chains to contain the round bales.

11. In combination:

a round baler capable of producing round bales of crop stock, said baler having a discharge end with a rear gate movable between an upwardly raised, open position and a downwardly lowered, closed position; and a round bale accumulator having first and second accumulator portions, each portion having front and rear ends, said bale accumulator being directly hitched to the discharge end of the baler;

said front end of said first accumulator portion disposed rearwardly adjacent said baler for directly receiving round bales of crop stock when said gate is in said open position;

said first accumulator portion having conveyor means for receiving and transporting round bales from said baler to said second accumulator portion;

said conveyor means disposed at a fixed angle relative to a horizontal plane, with said front end lower than said rear end and with said conveyor being inclined upwardly from the horizontal at an angle sufficiently shallow such that a round bale can clear said rear baler gate in its upwardly raised, open position as the bale is transported upwardly on the conveyor means towards the second accumulated portion; and said second accumulator portion adjacent said rear end of said first accumulator portion for receiving bales one at a time therefrom.

12. The combination of claim 11 wherein:

said first accumulator portion and said second accumulator portion are aligned axially with each other and with said baler in the direction of baler travel.

* * * * *

UNITED STATES PATENT AND TRADEMARK OFFICE
CERTIFICATE OF CORRECTION

PATENT NO. : 5,664,923

DATED : 09/09/97

INVENTOR(S) : Ray L. Olin

It is certified that error appears in the above-indentified patent and that said Letters Patent is hereby corrected as shown below:

Column 3, line 29,
after the words "module, a" delete "bile" and substitute --bale-- therefor.

Signed and Sealed this

Twenty-fourth Day of March, 1998

Attest:

BRUCE LEHMAN

Attesting Officer

Commissioner of Patents and Trademarks